US 9,489,033 B2

(12) United States Patent
Hays

(10) Patent No.: US 9,489,033 B2
(45) Date of Patent: *Nov. 8, 2016

(54) SYSTEMS AND METHODS FOR REDUCING POWER CONSUMPTION OF A COMMUNICATION DEVICE

(71) Applicant: Intel Corporation, Santa Clara, CA (US)

(72) Inventor: Robert Hays, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/461,635

(22) Filed: Aug. 18, 2014

(65) Prior Publication Data
US 2015/0046731 A1 Feb. 12, 2015

Related U.S. Application Data

(63) Continuation of application No. 13/647,262, filed on Oct. 8, 2012, now Pat. No. 8,839,015, which is a continuation of application No. 11/936,327, filed on Nov. 7, 2007, now Pat. No. 8,312,307.

(51) Int. Cl.
G06F 1/32 (2006.01)
H04L 12/10 (2006.01)

(52) U.S. Cl.
CPC ............ *G06F 1/324* (2013.01); *G06F 1/3293* (2013.01); *H04L 12/10* (2013.01)

(58) Field of Classification Search
CPC ........................... G06F 1/324; G06F 1/3293

USPC .................................................. 713/320, 323
See application file for complete search history.

(56) References Cited

U.S. PATENT DOCUMENTS

| | | | | |
|---|---|---|---|---|
| 5,802,305 A | * | 9/1998 | McKaughan et al. | 709/227 |
| 6,292,831 B1 | * | 9/2001 | Cheng | 709/224 |
| 6,408,006 B1 | | 6/2002 | Wolff | |
| 6,463,542 B1 | * | 10/2002 | Yu et al. | 713/320 |
| 7,039,430 B2 | * | 5/2006 | Kang et al. | 455/458 |
| 7,212,786 B2 | * | 5/2007 | Kojima et | 455/41.2 |
| 7,269,629 B2 | | 9/2007 | Zmudzinski et al. | |
| 7,313,712 B2 | * | 12/2007 | Cherukuri et al. | 713/324 |
| 7,577,857 B1 | * | 8/2009 | Henderson et al. | 713/320 |
| 8,312,307 B2 | * | 11/2012 | Hays | 713/323 |

(Continued)

FOREIGN PATENT DOCUMENTS

| | | |
|---|---|---|
| EP | 1783951 A2 | 5/2007 |
| EP | 2210368 B1 | 7/2015 |
| WO | 2007/049203 A2 | 5/2007 |

OTHER PUBLICATIONS

Mohapatra S et al., "DYNAMO: A Cross-Layer Framework for End-to-End QoS and Energy Optimization in Mobile Handheld Devices", IEEE Journal on Selected Areas in Communications, IEEE Service Center, Piscataway, US, vol. 25, No. 4, May 1, 2007, pp. 722-737.

(Continued)

*Primary Examiner* — Chun Cao
(74) *Attorney, Agent, or Firm* — Alpine Technology Law Group LLC

(57) ABSTRACT

Generally, this disclosure describes an energy-efficient Ethernet communications approach including use of clock gating of transmit circuitry.

31 Claims, 5 Drawing Sheets

(56) References Cited

U.S. PATENT DOCUMENTS

| | | | |
|---|---|---|---|
| 8,839,015 B2* | 9/2014 | Hays | 713/323 |
| 2002/0004840 A1 | 1/2002 | Harumoto et al. | |
| 2002/0196736 A1 | 12/2002 | Jin | |
| 2004/0025063 A1 | 2/2004 | Riley | |
| 2004/0029622 A1 | 2/2004 | Laroia et al. | |
| 2004/0106431 A1 | 6/2004 | Laroia et al. | |
| 2005/0003836 A1 | 1/2005 | Inoue et al. | |
| 2005/0128990 A1* | 6/2005 | Eom et al. | 370/338 |
| 2005/0147082 A1 | 7/2005 | Keddy et al. | |
| 2005/0190709 A1* | 9/2005 | Ferchland et al. | 370/311 |
| 2005/0243795 A1 | 11/2005 | Kim et al. | |
| 2006/0164774 A1 | 7/2006 | Herbold et al. | |
| 2007/0253399 A1 | 11/2007 | Deshpande et al. | |
| 2008/0159183 A1 | 7/2008 | Lindoff et al. | |
| 2009/0164821 A1* | 6/2009 | Drescher | 713/323 |
| 2015/0134991 A1 | 5/2015 | Wertheimer et al. | |

OTHER PUBLICATIONS

Shiao-Li Tsao et al., "Reducing voice over WLAN call setup delay under limited access point buffer", Consumer Communications and Networking Conference, 2006. CCNC 2006. 20 06 3rd IEEE Las Vegas, NV, USA Jan. 8-10, 2006, Piscataway, NJ, USA, IEEE, vol. 1, Jan. 8, 2006, pp. 380-384.

Office Action received for Chinese Patent Application No. 201210290613.4, mailed on May 20, 2015, 13 pages, including 7 pages of English translation.

Office Action received for Chinese Patent Application No. 201210290613.4, mailed on Sep. 1, 2014, 15 pages including 9 pages of English translation.

Office Action received for Chinese Patent Application No. 201210290613.4, mailed on Dec. 7, 2015, 9 pages including 5 pages of English translation.

International Search Report and Written Opinion received for International Application No. PCT/US2008/082577, mailed on May 25, 2009, 10 pages.

Office Action received for Chinese Patent Application No. 200880115221.6, mailed on Apr. 6, 2012, 15 pages including 9 pages of English translation.

Office Action received for Chinese Patent Application No. 200880115221.6, mailed on Jan. 7, 2013, 14 pages including 8 pages of English translation.

European Search Report received for European Application No. 08848070.2, mailed on Oct. 2, 2013, 3 pages.

Office Action received for European Patent Application No. 08848070.2, mailed on Oct. 15, 2013, 5 pages.

Office Action received for Chinese Patent Application No. 201210290613.4, mailed on May 27, 2016, 5 pages.

* cited by examiner

SYSTEMS AND METHODS FOR REDUCING POWER CONSUMPTION OF A COMMUNICATION DEVICE

RELATED APPLICATIONS

This application claims priority to and is a continuation of U.S. patent application Ser. No. 13/647,262, entitled "SYSTEMS AND METHOD FOR REDUCING POWER CONSUMPTION OF A COMMUNICATION DEVICE", which in term claims priority and is a continuation of U.S. patent application Ser. No. 11/936,327, entitled "SYSTEMS AND METHODS FOR REDUCING POWER CONSUMPTION DURING COMMUNICATION BETWEEN LINK PARTNERS" filed on Nov. 7, 2007, and issued as U.S. Pat. No. 8,312,307.

BACKGROUND

Current Ethernet solutions either remain operating at a given speed, e.g. 1000BASE-T, regardless of the bandwidth utilization, and thus consume more power than necessary, or they require software drivers to drop the link and auto-negotiate to a new, lower speed to save power, but losing link for several seconds in the process making that option unsuitable for many applications. IEEE 802.3 Working Group has recently formed an Energy-Efficient Ethernet (EEE) Task Force, officially named 802.3az, to define a solution for reducing the average power consumption of Ethernet by addressing the issues noted above with current solutions. So far there have been two proposals to the IEEE Task Force for EEE, both of which recommend rate-shifting to track the bandwidth utilization demand. Rate-shifting, as proposed by the EEE Task Force, is a technique where the Ethernet communication speed may be up-shifted or down-shifted, depending on bandwidth demand. For example, during periods of low demand, the speed may be shifted down from a fast communication speed to a slower communication speed (e.g., 1000BASE-T to 100BASE-TX). As demand increases, the speed may be shifted up.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Generally, this disclosure describes an energy-efficient Ethernet communications approach. In at least one embodiment described herein, an Ethernet controller may be configured to operate in an active power state to transmit or receive data packets (when available) at a maximum available link speed. The maximum available link speed (e.g., 1000BASE-T (GbE), 10GBASE-T, etc.) may be determined by a negotiation between the Ethernet controller and a link partner coupled to the Ethernet controller. Once the data packets are transmitted or received, the Ethernet controller may be configured to operate in an idle power state to reduce energy consumption. The "idle power state", as used herein, may be defined as a power state that is sufficient to maintain an open link with the link partner, but insufficient to transmit or receive data. In other words, the "idle power state", as used herein, is a threshold power consumption state that is below a power consumption state to transmit at least one data packet, while maintaining the Ethernet communications link between the Ethernet controller and the link partner. The "active power state", as used herein, may include an "active data transmission power state" defined as a power state to transmit data at a maximum available link speed, and an "active data receive power state" defined as a power state to receive data at a maximum available link speed.

Figure 1:
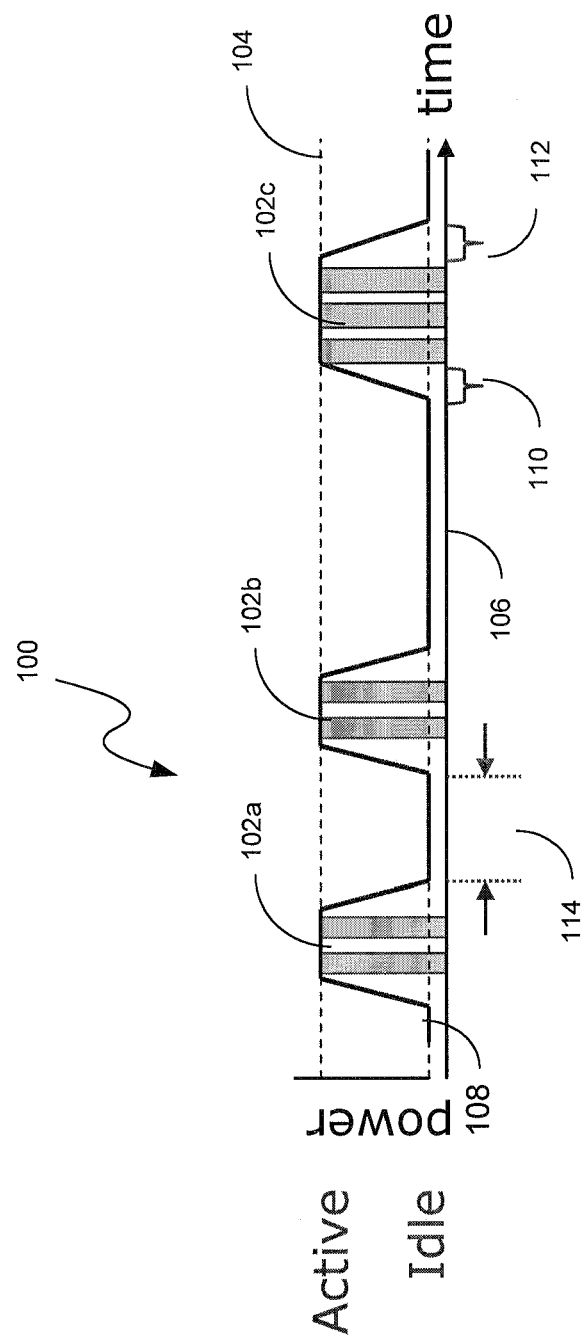
FIG. 1 depicts a graph of power vs. time consistent with one exemplary embodiment of the present disclosure.

FIG. 1 depicts a graph 100 of power vs. time consistent with one exemplary embodiment of the present disclosure. In this embodiment, data packets 102a, 102b, 102c may be transmitted or received in a burst fashion at a maximum active power state 104 (e.g., a maximum available link speed). When data packets are available to be transmitted or received, an Ethernet controller (not shown in this Figure) may toggle power between an idle state 108 and an active state 104. In this example, the active power state 104 is a power state associated with the maximum available data transmission or reception speed. The idle power state 108 is a power state that is sufficient to maintain an open link with the link partner, but insufficient to transmit or receive data. The idle power state 108, in this example, represents a power consumption that is slightly larger than an off state 106 and significantly lower than the active power state 104.

During a transition from idle power state 108 to active power state 104, there may be a first delay period 110. Likewise, during a transition between the active power state 104 to the idle power state 108, there may be a second delay period 112. The idle interval 114 between packet bursts (e.g., between burst 102a and 102b) may be based on bandwidth considerations and/or the amount of data available in a data buffer.

Figure 2:
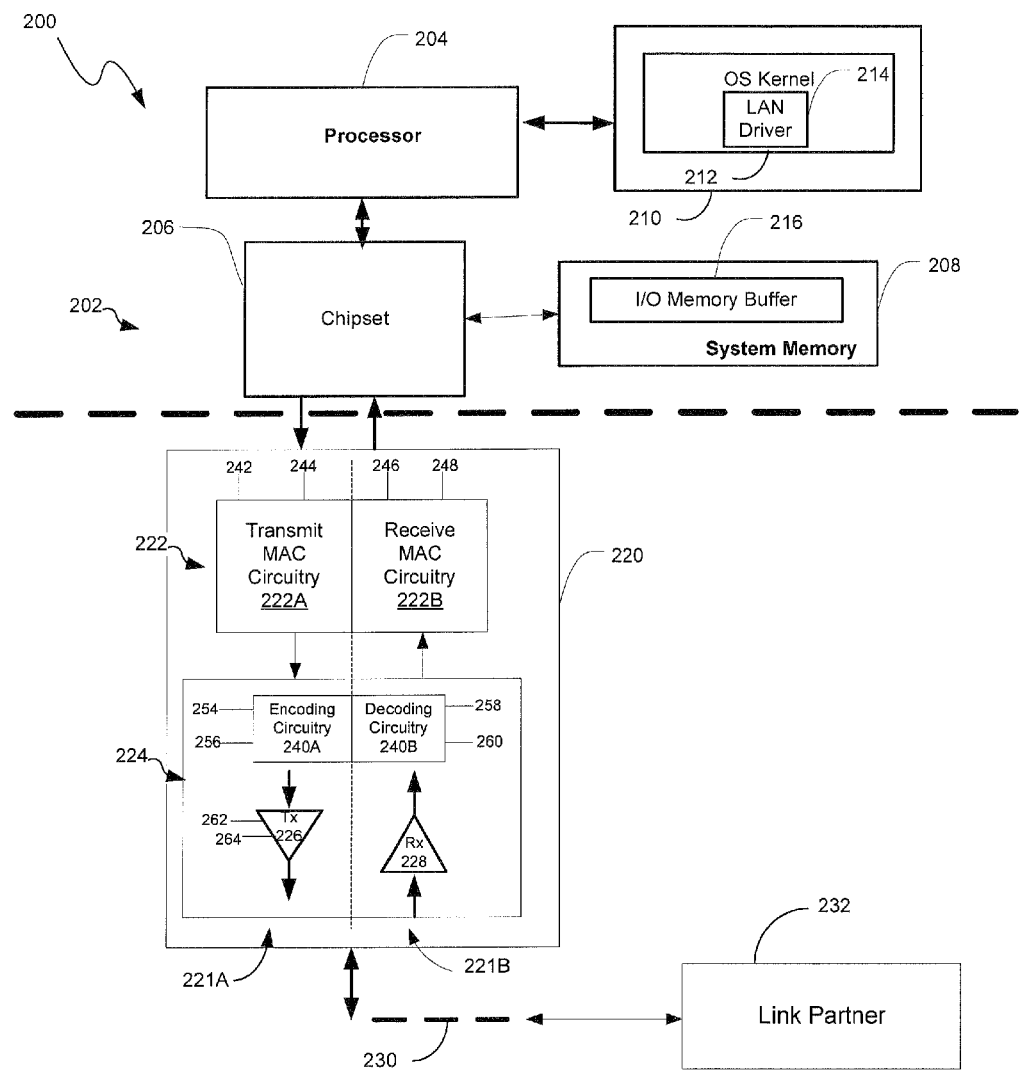
FIG. 2 illustrates a system embodiment consistent with the present disclosure.

FIG. 2 illustrates a system embodiment 200 consistent with the present disclosure. The system 200 includes a host system 202 and an Ethernet controller 220. The host system 202 may include a host processor 204, chipset circuitry 206 and system memory 208. The host processor 204 may include one or more processor cores and may be configured to execute system software 210. System software 210 may include, for example, operating system code 212 (e.g., OS kernel code) and local area network (LAN) driver code 214. LAN driver code 214 may be configured to control, at least in part, the operation of the Ethernet controller 220 operation, as will be described in greater detail below. System memory 208 may include I/O memory buffers 216 configured to store one or more data packets that are to be transmitted by, or received by, Ethernet controller 220. Chipset circuitry 206 may generally include "North Bridge" circuitry (not shown) to control communication between the processor 204, Ethernet controller 220 and system memory 208. Also, chipset circuitry 206 may include "South Bridge" circuitry (not shown) to control I/O communications between the host system 202 and the Ethernet controller 220. "South Bridge" circuitry may include I/O bus circuitry which may comply, or is compatible, with PCI-Express communications protocol to provide communications between chipset circuitry 206 and the Ethernet controller 220.

Ethernet controller 220 may be logically and/or physically divided into a transmit path 221A and a receive path 221B. The Ethernet controller may generally include Ethernet media access control (MAC) circuitry 222 and physical interface (PHY) circuitry 224. MAC circuitry 222 may include transmit MAC circuitry 222A configured to assemble data to be transmitted into frames, or packets, that include destination and source addresses along with network control information and error detection hash values. MAC circuitry 222 may also include receive MAC circuitry 222B configured to remove data from received frames and place the data in system memory 208. PHY circuitry 224 may include encoding circuitry 240A configured to encode data packets and decoding circuitry 240B configured to decode data packets. Encoding circuitry 240A and decoding circuitry 240B may collectively be embodied as a processor (for example, a digital signal processor) configured to perform analog-to-digital and digital-to-analog conversion, encoding and decoding of data, analog parasitic cancellation (for example, cross talk cancellation), and recovery of received data. PHY circuitry 224 may also include transmit (Tx) circuitry 226 configured to transmit one or more data packets and receive (Rx) circuitry 228 configured to receive one or more data packets. Rx circuitry 228 may include phase lock loop circuitry (PLL, not shown) configured to coordinate timing of data reception. The PHY circuitry 224 may be coupled to an Ethernet communications link 230. The Ethernet communications link 230 may comprise, for example, a media dependent interface which may include, for example Category 6 (Cat6) Ethernet cable.

Transmit MAC circuitry 222A may include a controllable clock input 242 and a controllable power input 244. Clock input 242 may generally include a clock signal that controls the clocking of the MAC circuitry 222A. Power input 244 may generally include a power supply signal to supply power to one or more components of the MAC circuitry 222A. Similarly, Receive MAC circuitry 222B may include a controllable clock input 246 and a controllable power input 248. Clock input 246 may generally include a clock signal that controls the clocking of the MAC circuitry 222B. Power input 248 may generally include a power supply signal to supply power to one or more components of the MAC circuitry 222B. Encoding circuitry 240A may include a controllable clock input 254 and a controllable power input 256, and decoding circuitry 240B may include a controllable clock input 258 and a controllable power input 260. Transmit circuitry 226 may include a controllable clock input 262 and a controllable power input 264. In one embodiment, clocking of the transmit path 221A and receive path 221B may be independently controlled. Also, in one embodiment, the power of transmit path 221A and receive path 221B may be independently controlled.

The Ethernet controller 220 may be configured to exchange commands and data with a link partner 232, via communications link 230. "Link partner" as used herein, means any device that is configured to communicate with the Ethernet controller 220 using an Ethernet communications protocol. In at least one embodiment, the link partner 232 may include a switch, bridge, router and/or other Ethernet controller (which may be associated with a host system similar to host system 202) that may be configured and operate in a manner consistent with the description of the Ethernet controller 220 provided herein.

Ethernet controller 220 may be configured to transmit at least one data packet to the link partner 232, or receive at least one data packet from the link partner 232. As stated, the Ethernet controller 220 may be configured to operate, at least in part, in an idle power state and an active power state. In one embodiment, to transition into the idle state from the active data transmission power state, the Ethernet controller 220 may be configured to control the clock input 242, 254 and/or 262. To transition into the idle power state from an active data reception power state, the Ethernet controller 220 may be configured to control the clock input 246 and/or 258. To that end, the clock inputs 242, 254, 262, 246 and/or 258 may be gated (clock gating) to turn the clock signal OFF to the corresponding circuitry.

To permit asymmetric power management, the clock inputs of the transmit path circuitry may be controlled independently of the clock inputs of the receive path circuitry. This may allow, for example, the circuitry in that transmit path 221A to be in the idle power state while the circuitry in the receive path 221B is in the active state (or, vice-versa). Clock gating, as used herein, may provide a mechanism to achieve idle power state, as defined herein, in which the power consumption of the circuitry that is clock gated is sufficient to maintain an open link with the link partner 232 (via communications link 230), but insufficient for the Ethernet controller 220 to transmit or receive data. To transition from the idle power state to the active power state, the Ethernet controller 220 may be configured to turn the clock signals 242, 254, 262, 246 and/or 258 to an ON state to permit, for example, the Ethernet controller 220 to transmit and/or receive data.

Operations of the Ethernet controller 220 during data transmission and data reception, in conjunction with other features of the system of FIG. 2, are described below:

Tx_Active Transition

As stated, the Ethernet controller 220 may be configured to transition, at least in part, from an idle power state to an active data transmission power state to transmit data. To that end, the LAN driver code 214, as may be executed by host processor 204, may be configured to determine the presence of at least one data packet, as may be stored in the I/O memory buffer 216, to be transmitted. The driver 214 may generate a transmit active control signal to control the Ethernet controller 220 to transition from the idle power state into an active data transmission power state. The clock signals 242 may be applied to the transmit MAC circuitry 222A, and clock signals 254 and 262 may be applied to the encoding circuitry 240A and transmit circuitry 226, respectively. If the link partner 232 is configured in a similar manner, transmit circuitry 226 may be configured to generate a receive active control signal to "wake up" the corresponding receive circuitry and MAC circuitry of the link partner 232 in order to prepare the link partner 232 to receive data from the Ethernet controller 220. After a specified delay period (e.g., delay period 110 depicted in FIG. 1), the Ethernet controller 220 may begin to transmit data to the link partner 232.

Tx_Idle Transition

As stated, the Ethernet controller 220 may be configured to transition from an active data transmission power state to an idle power state. To that end, the LAN driver code 214, as may be executed by host processor 204, may be configured to determine that there are no data packets ready for transmission, for example, by monitoring the I/O memory buffer 216, to determine if the buffer is empty. The driver 214 may generate an idle control signal to control the Ethernet controller 220 to transition from the active data transmission power state into the idle power state. The clock signal 242 may be gated to the MAC circuitry 222A to permit the MAC circuitry 222A to drop to an idle power consumption mode. Likewise, clock signals 254 and/or 262 may be gated to the encoding circuitry 240A and/or transmit circuitry 226, respectively, to permit the encoding circuitry 240A and/or the transmit circuitry 226 to drop to an idle power consumption mode. If the link partner 232 is configured in a similar manner, transmit circuitry 226 may be configured to generate a receive idle control signal to transition the corresponding decoding circuitry and MAC circuitry of the link partner 232 into an idle power state.

Rx_Active Transition

The Ethernet controller 220 may also be configured to transition, at least in part, from an idle power state to an active data reception power state to receive data from the link partner 232. To that end, the link partner 232 may generate a receive active control signal to the receive circuitry 228. To that end, while the decoding circuitry 240B and the receive MAC circuitry 222B may each be in an power idle state, the receive circuitry 228 may be in an active power state so that link 230 between the PHY circuitry 224 and the link partner 232 remains open. The receive active control signal generated by the link partner 232 may comprise a burst signal that can be received and recognized by the receive circuitry 228. In response thereto, the PHY circuitry 224 may transition the decoding circuitry 2240B from an idle power state to an active power state, and PHY circuitry 224 may also generate a receive active control signal to transition the receive MAC circuitry 222B from an idle power state to the active power state. To that end, the clock signals 258 and 246 may be applied (e.g., ungated) to the encoding circuitry 240B and MAC circuitry 222B, respectively, to permit the MAC circuitry 222B and decoding circuitry 240B to receive data from the link partner 232. After a defined delay period (e.g., delay period 110 depicted in FIG. 1), the Ethernet controller 220 may begin to receive data from the link partner 232. The data may be stored in the buffer memory 216.

Rx_Idle Transition

As stated, the Ethernet controller 220 may be configured to transition, at least in part, from an active data reception power state to an idle power state. To that end, PHY circuitry 224 may be configured to receive a receive idle control signal from the link partner 232. In response thereto, the PHY circuitry 224 may transition the decoding circuitry 240B from an active power state to the idle power state (which, as noted above, may include clock gating of the decoding circuitry 240B). PHY circuitry 224 may also generate a receive idle control signal to transition the receive MAC circuitry 222B from an active data reception power state to the idle power state.

The control signals exchanged between the Ethernet controller 220 and the link partner 232, as described above, may include, for example, control frames generated by respective PHY circuitry that include encoded signals to transition to the active power state or the idle power state. Alternatively, the control signals may comprise analog burst signals having predefined characteristics that may be interpreted by respective PHY circuitry as control signals to transition into the active power state or the idle power state. Further alternatively, such control signals may be generated by MAC circuitry 222 in the form of, for example, header or footer data within a data packet.

Figure 3:
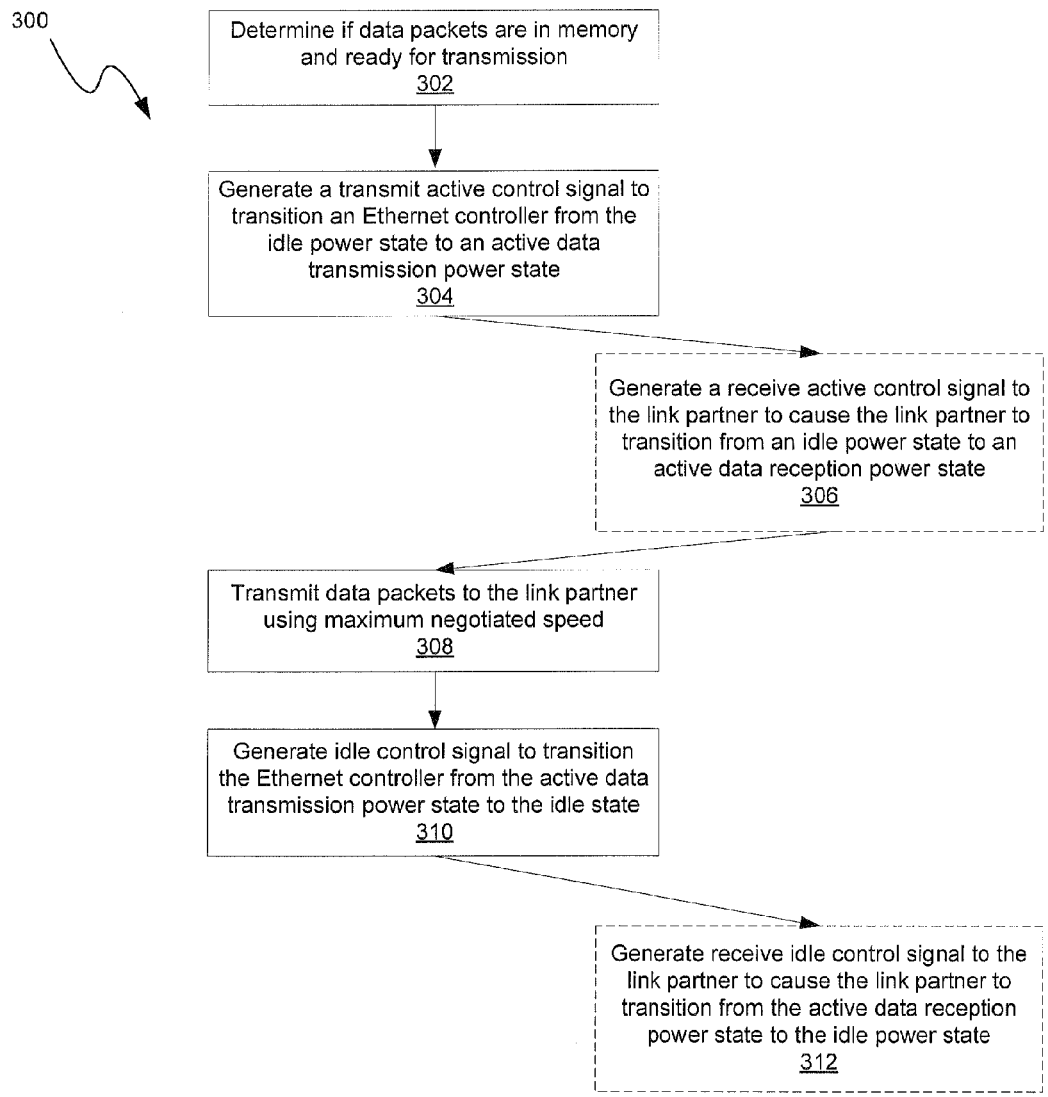
FIG. 3 depicts a flowchart of exemplary data transmission operations consistent with the present disclosure.

FIG. 3 depicts a flowchart 300 of exemplary data transmission operations consistent with the present disclosure. Operations may include determining if data packets are in memory and available for transmissions 302. Operations may also include generating a transmit active control signal to transition an Ethernet controller, at least in part, from an idle power state to an active data transmission power state 304. If a link partner, coupled to the Ethernet controller is similarly configured, operations may also include generating a receive active control signal to the link partner to cause the link partner to transition, at least in part, from an idle power state to an active data reception power state 306. Operations may also include transmitting data packets to the link partner using a maximum negotiated speed 308. Once the data packets are transmitted, operations may further include generating an idle control signal to transition the Ethernet controller from the active data transmission power state to the idle power 310. Again, if the link partner is similarly configured, operations may also include generating a receive idle control signal to the link partner to cause the link partner to transition from the active data reception power state to the idle power state 312.

Figure 4:
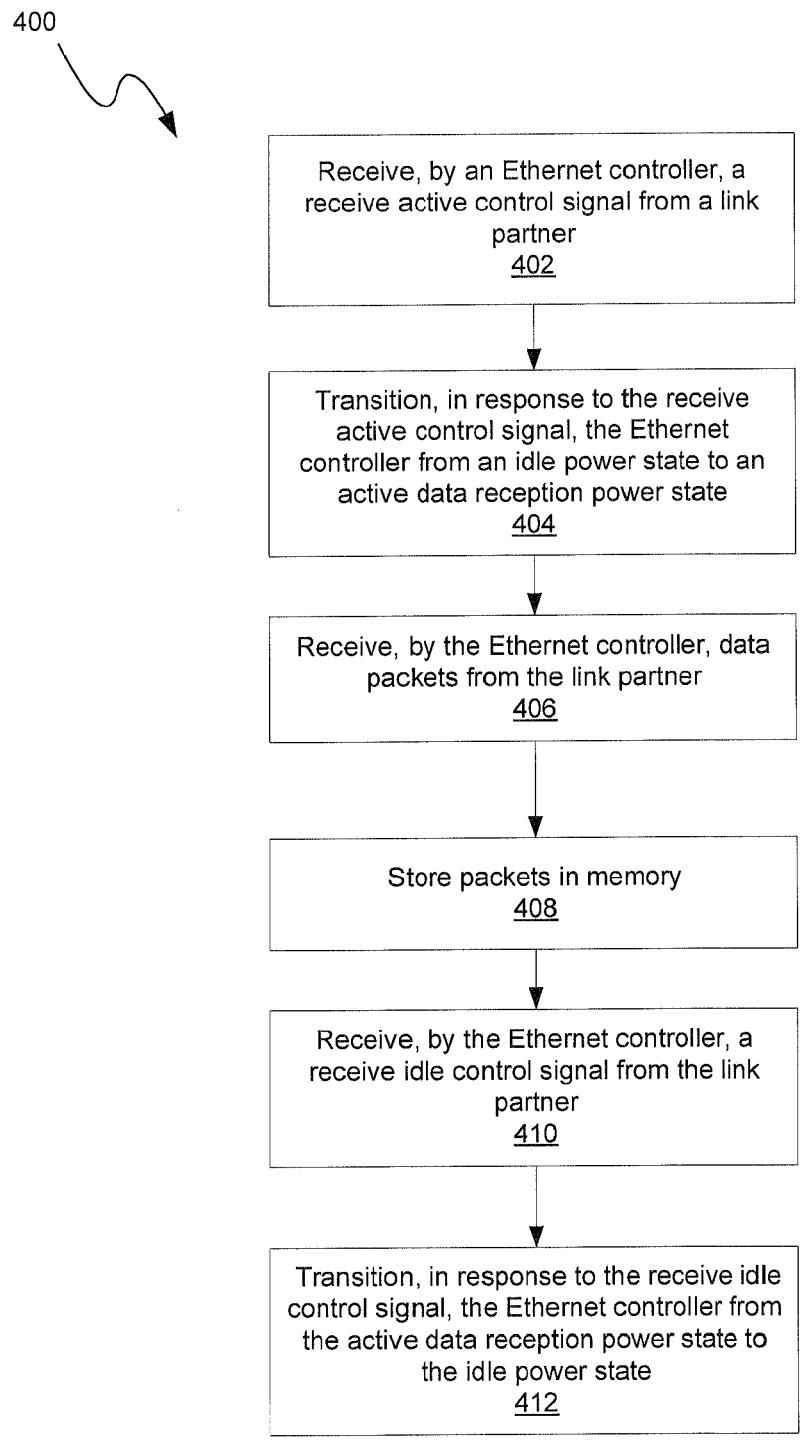
FIG. 4 depicts a flowchart of exemplary data reception operations consistent with the present disclosure.

FIG. 4 depicts a flowchart 400 of exemplary data reception operations consistent with the present disclosure. Operations may include receiving, by an Ethernet controller, a receive active control signal from a link partner 402. Operations may also include transitioning, at least in part and in response to the receive active control signal, the Ethernet controller from an idle power state to an active data reception power state 404. Operations may also include receiving, by the Ethernet controller, data packets from the link partner 406. The data packets may be stored in memory 408. Operations may also include receiving, by the Ethernet controller, a receive idle control signal from the link partner 410. Operations may also include transitioning, at least in part and in response to the receive idle control signal, the Ethernet controller from the active data reception power state to the idle power state 412.

Figure 5A:
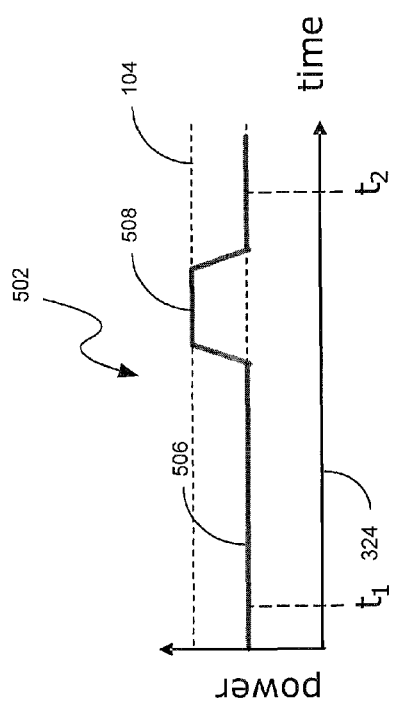
FIG. 5A depicts a power profile graph according to a rate-shifting Ethernet communications technique.
Figure 5B:
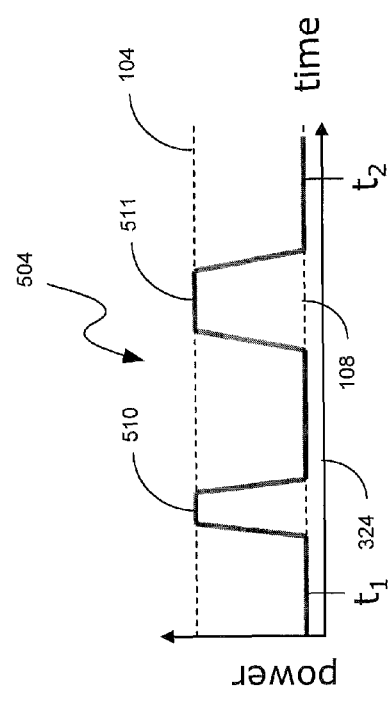
FIG. 5B depicts a power profile graph consistent with the present disclosure.

The foregoing description of idle power state in connection with an Ethernet controller offer significant power savings over other approaches. FIG. 5A depicts a power profile graph 502 according to a rate-shifting Ethernet communications technique, and FIG. 5B depicts a power profile graph 504 consistent with the present disclosure. In general, power consumption (energy consumption) may be expressed as the area under the power curve, i.e., $$\int_{t1}^{t2} \text{power}(t)\,dt$$

Average power may be defined as energy consumption over a given time interval. As shown, the power profile 502 of the rate-shifting technique starts at a first power level 506 where data transmission or reception is possible but at a relatively low bandwidth, for example $1/10^{th}$ or $1/100^{th}$ the maximum rate, and, based on increased bandwidth utilization or other considerations, increases power to a second higher level 508 for faster data transmission or reception. Thus, the energy consumption is defined as both the area under region 506 and under region 508. In contrast, the power profile 504 according to the present disclosure, data is transmitted or received at a maximum available speed, as depicted as the area in regions 510 and 511. Once data is transmitted or received, the power is reduced to the idle power state 108. The average power utilized by the rate shifting technique is greater than the average power utilized by the active/idle toggle technique of the present disclosure, especially when long-term usage is considered. Unexpectedly, the applicant herein has determined that while the operating power is greater at the fastest available speed, total energy consumption is reduced, by completing the transmission more quickly and transitioning to the idle power state after data transmission or reception.

The foregoing examples are described in reference to power gating of one or more components of the Ethernet controller to achieve an idle power state. In other embodiments, additionally or as an alternative to clock gating, the Ethernet controller may also be configured to discontinue power (e.g., power gating) to the MAC circuitry 222 and/or the PHY circuitry 224. While power gating may achieve the appropriate idle power state as defined herein, this technique may cause an additional delay between idle to active transition.

Ethernet controller 220 may also include I/O bus circuitry (not shown) to provide I/O communications between the Ethernet controller 220 and the chipset circuitry 206 (such bus circuitry may comply with the aforementioned PCI-Express communications protocol). Ethernet controller may also include MAC/PHY interface circuitry (not shown) configured to provide I/O communications between the MAC circuitry 220 and the PHY circuitry 224 (which may include, for example SGMII or XAUI).

Memory 208 and/or memory associated with the Ethernet controller 220 (not shown) may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 208 and/or memory associated with the Ethernet controller 220 (not shown) may comprise other and/or later-developed types of computer-readable memory. Embodiments of the methods described herein may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The Ethernet communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

As used herein, a "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. PHY circuitry 224 may comply or be compatible with, the aforementioned IEEE 802.3 Ethernet communications protocol, which may include, for example, 100BASE-TX, 100BASE-T, 10GBASE-T, 10GBASE-KR, 10GBASE-KX4/XAUI, 40 GbE and or 100 GbE compliant PHY circuitry, and/or PHY circuitry that is compliant with an after-developed communications protocol.

"Circuitry", as used in any embodiment herein, may comprise, for example, singly or in any combination, hard-wired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system comprising:
   circuitry, comprising an Ethernet MAC (Media Access Control), capable, when operational, to:
      cause generation of a signal indicating a lower power idle power state, the lower power idle power state comprising a lower power state than an active power state;
      cause generation of a wake signal for a first Ethernet link partner;
      after a predefined period of time, cause transmission of at least one Ethernet data frame to the first Ethernet link partner;
      the circuitry, capable, when operational, to reduce power consumed by transmit circuitry in the lower power idle state, the circuitry to reduce power consumed by the transmit circuitry to control clock gating of a clock signal of the transmit circuitry.

2. The system of claim 1, wherein the circuitry comprises a PHY.

3. The system of claim 2, wherein the PHY comprises at least one of the following: a 10GBASE-T PHY and a 1000BASE-T PHY.

4. The system of claim 1, wherein the circuitry comprises circuitry capable, when operational, to reduce power consumed by the PHY when in the lower power idle state.

5. The system of claim 4, wherein the circuitry capable, when operational, to reduce power consumed by the PHY comprises circuitry to clock gate a clock signal of the PH0059.

6. The system of claim 1, wherein the circuitry comprises circuitry of an Ethernet controller.

7. The system of claim 1, further comprising:
   a host processor; and
   memory external to the host processor.

8. The system of claim 1, wherein the circuitry comprises circuitry capable, when operational, to cause transfer of Ethernet data frames at a data rate negotiated with the first Ethernet link partner.

9. The system of claim 1, wherein the circuitry comprises circuitry capable, when operational, to clock gate a clock signal of the Ethernet MAC.

10. The system of claim 1, wherein the circuitry comprises circuitry capable, when operational, to clock gate an encoder.

11. The system of claim 1, wherein the circuitry does not transmit an Ethernet data frame to the first Ethernet link partner when in the lower power idle state.

12. The system of claim 1, wherein the circuitry comprises circuitry, when operational, to determine when to initiate the lower power idle state based on an amount available in a data buffer.

13. The system of claim 1, wherein the circuitry comprises circuitry capable, when operational, to:
receive a wake signal from the first Ethernet link partner; and
receive at least one Ethernet data frame from the first Ethernet link partner.

14. The system of claim 13, wherein the circuitry comprises circuitry capable, when operational, to reduce power consumed by receive circuitry.

15. The system of claim 14, wherein the circuitry comprises circuitry capable, when operational, to clock gate a decoder.

16. The system of claim 14, wherein the circuitry comprises circuitry capable, when operational, to clock gate Rx circuitry of a PHY.

17. The system of claim 1, wherein the circuitry comprises circuitry capable, when operational, to clock gate at least one element of a transmit path and at least one element of a receive path.

18. The system of claim 17, wherein the circuitry capable, when operational, to clock gate at least one element of a transmit path and at least one element of a receive path comprises circuitry to clock gate the at least one element of the transmit path independently of circuitry to clock gate the at least one element of the receive path.

19. The system of claim 1, further comprising an SGMII.

20. An article comprising a non-transitory storage medium having stored thereon instructions that when executed enable circuitry to be capable to:
cause generation of a signal indicating a lower power idle power state, the lower power idle power state comprising a lower power state than an active power state;
cause generation of a wake signal for a first Ethernet link partner;
after a predefined period of time, cause transmission of at least one Ethernet data frame to the first Ethernet link partner;
wherein the instructions that when executed enable circuitry to be capable to reduce power consumed by transmit circuitry in the lower power idle state comprise instructions that when executed enable circuitry to be capable to control clock gating of a clock signal of the transmit circuitry.

21. The article of claim 20, wherein the instructions comprise instructions that when executed enable circuitry to be capable to reduce power consumed by a PHY when in the lower power idle state.

22. The article of claim 21, wherein the instructions comprise instructions that when executed enable circuitry to be capable to reduce power consumed by the PHY comprise instructions that when executed enable circuitry to be capable to clock gate a clock signal of the PHY.

23. The article of claim 20, wherein the instructions comprise instructions that when executed enable circuitry to be capable to clock gate a clock signal of the Ethernet MAC.

24. The article of claim 20, wherein the instructions comprise instructions that when executed enable circuitry to be capable to clock gate an encoder.

25. The article of claim 20, wherein the instructions comprise instructions that when executed enable circuitry to:
receive a wake signal from the first Ethernet link partner; and
receive at least one Ethernet data frame from the first Ethernet link partner.

26. The article of claim 20, wherein the instructions comprise instructions that when executed enable circuitry to reduce power consumed by receive circuitry.

27. The article of claim 20, wherein the instructions comprise instructions that when executed enable circuitry to clock gate a decoder.

28. The article of claim 20, wherein the instructions comprise instructions that when executed enable circuitry to clock gate Rx circuitry of a PHY.

29. The article of claim 20, wherein the instructions comprise instructions that when executed enable circuitry to clock gate at least one element of a transmit path and at least one element of a receive path.

30. The article of claim 29, wherein the instructions comprise instructions that when executed enable circuitry to clock gate the at least one element of the transmit path independently of circuitry to clock gate the at least one element of the receive path.

31. The article of claim 20, wherein the instructions comprise instructions that when executed enable circuitry to determine when to initiate the lower power idle state based on an amount available in a data buffer.

* * * * *